United States Patent
Van Kessel

(10) Patent No.: US 9,735,706 B2
(45) Date of Patent: Aug. 15, 2017

(54) METHOD AND SYSTEM FOR HARVESTING ENERGY USING AN EAP BASED DEFORMABLE BODY

(71) Applicant: SINGLE BUOY MOORINGS INC., Marly (CH)

(72) Inventor: Rick Van Kessel, Nice (FR)

(73) Assignee: SINGLE BUOY MOORINGS INC., Marly (CH)

(*) Notice: Subject to any disclaimer, the term of this patent is extended or adjusted under 35 U.S.C. 154(b) by 461 days.

(21) Appl. No.: 14/399,311

(22) PCT Filed: May 7, 2013

(86) PCT No.: PCT/EP2013/059463
§ 371 (c)(1),
(2) Date: Nov. 6, 2014

(87) PCT Pub. No.: WO2013/167577
PCT Pub. Date: Nov. 14, 2013

(65) Prior Publication Data
US 2015/0076962 A1    Mar. 19, 2015

(30) Foreign Application Priority Data
May 10, 2012  (EP) .................................... 12167568

(51) Int. Cl.
*H02N 1/08* (2006.01)
*H02N 10/00* (2006.01)
(Continued)

(52) U.S. Cl.
CPC .............. *H02N 1/08* (2013.01); *H02N 2/181* (2013.01); *H02N 10/00* (2013.01); *H02N 11/002* (2013.01)

(58) Field of Classification Search
CPC .......... H02N 1/08; H02N 2/181; H02N 10/00; H02N 11/002
(Continued)

(56) References Cited

U.S. PATENT DOCUMENTS 6,768,246 B2 *  7/2004  Pelrine .................... F02G 1/043
                                                          310/317
7,557,456 B2 *  7/2009  Kornbluh ............ F03B 13/1845
                                                          290/42
(Continued)

FOREIGN PATENT DOCUMENTS

EP    2 282 048      2/2011
WO    2010/146457    6/2010

OTHER PUBLICATIONS

International Search Report dated Jun. 19, 2013, corresponding to PCT/EP2013/059463.

*Primary Examiner* — John K Kim
(74) *Attorney, Agent, or Firm* — Young & Thompson

(57) ABSTRACT

Method for harvesting energy using an EAP based deformable body. The EAP based deformable body is an elastically deformable body including an arrangement of stretchable synthetic material and electrodes being arranged as a variable capacitor with a capacitance that varies as the deformable body stretches and relaxes. The method includes: looping through an energy harvesting cycle with a) stretching the deformable body from a minimal relaxed size L1 to a maximal stretched size L2;
b) at the maximal stretched size electrically charging of the variable capacitor to create an electric field over the capacitor with an upper electric field level value; and subsequently c) a relaxation step from maximal stretched size to the minimal relaxed size; d) at the minimal relaxed size of the
(Continued)

deformable body, electrically discharging the capacitor to a minimal charge level and a minimal electric field level value.

23 Claims, 6 Drawing Sheets

(51) Int. Cl.
*H02N 11/00* (2006.01)
*H02N 2/18* (2006.01)

(58) Field of Classification Search
USPC .............................. 310/300, 306, 307, 309
IPC ............................................. H02N 1/08,10/00
See application file for complete search history.

(56) References Cited

U.S. PATENT DOCUMENTS

| | | | | |
|---|---|---|---|---|
| 2001/0035723 | A1* | 11/2001 | Pelrine | ................... F02G 1/043 318/116 |
| 2004/0124738 | A1* | 7/2004 | Pelrine | ................... F02G 1/043 310/307 |
| 2007/0257490 | A1 | 11/2007 | Kornbluh et al. | |
| 2012/0126667 | A1 | 5/2012 | Schapeler et al. | |
| 2014/0145550 | A1* | 5/2014 | Hitchcock | ............ H01L 41/113 310/300 |
| 2014/0232240 | A1* | 8/2014 | Hitchcock | ................ H02N 2/18 310/314 |
| 2015/0076962 | A1* | 3/2015 | Van Kessel | .............. H02N 1/08 310/300 |

\* cited by examiner

METHOD AND SYSTEM FOR HARVESTING ENERGY USING AN EAP BASED DEFORMABLE BODY

FIELD OF THE INVENTION

The present invention relates to a method for harvesting energy using an EAP based deformable body. Also, the present invention relates to a system for harvesting energy using an EAP based deformable body.

BACKGROUND ART

At present, EAP (Electro Active Polymers) based actuators and generators (i.e. EAP based energy converters) are operated by either passive harvesting systems, where the deformation itself of an EAP based deformable body which acts as a variable capacitor, forces a flow of energy, or by active systems that control the electrical field, voltage or charge directly. As the latter approach typically yields higher conversion efficiencies and higher energy densities, it is preferred for especially larger systems or efficiency sensitive (battery-powered) applications.

An active system is for example disclosed in WO 2010/146457.

The way the electric field is established and controlled during the excitation determines the amount of energy that is converted. This is described by energy harvesting cycles (SRI International); at present mainly three distinctive cycles are used in systems that charge and discharge the EAP actively; constant-charge, constant-voltage and constant-field cycles. The focus of these cycles is on the way the power electronic unit (PEU) interacts with the EAP device during stretching or contraction (or relaxation). In these periods, the net electromechanical conversion takes place.

For biasing (charging) and un-biasing (discharging) the EAP based capacitor, the cycles do not describe a specific strategy and charging and discharging are assumed to happen instantly at maximum and minimum stretch, respectively. In many existing systems, not much attention is paid to these conditions. Some systems allow a setting of the current amplitude during charging or discharging, but the (dis)charging time is not optimized for higher energy output given the material loss components nor is the converter power rating which are key for commercialization.

It is therefore an object of the invention to provide a method which overcomes the disadvantages of the prior art.

SUMMARY OF THE INVENTION

The object is achieved by a method for harvesting energy using an EAP based deformable body, the EAP based deformable body being a elastically deformable body comprising an arrangement of stretchable synthetic material and electrodes being arranged as a variable capacitor with a capacitance that varies as the deformable body stretches and relaxes, the method comprising:
looping through an energy harvesting cycle with a) stretching the deformable body from a minimal relaxed size to a maximal stretched size; b) at the maximal stretched size electrically charging of the variable capacitor to create an electric field over the capacitor with an upper electric field level value; and subsequently c) a relaxation step from maximal stretched size to the minimal relaxed size; d) at the minimal relaxed size of the deformable body, electrically discharging the capacitor to a minimal charge level and a minimal electric field level value,
wherein the charging starts during stretching of the deformable body and is initiated at a first stretched size before reaching the maximal stretched size and continues after reaching the maximum during relaxation up to a level of a third stretched size, and the discharging starts during relaxation of the deformable body and is initiated at a second stretched size before reaching the minimal relaxed size, and continues after reaching the minimum during stretching up to a level of a fourth stretched size.

Advantageously, by charging and discharging with increased duration, the converter is operating for a larger period in a cycle. This makes the operation more continuous and increases the converter utilization. As a result, the PEU and its components are less subject to thermal cycling as normally experienced in applications with pulsating power. By smoothing the power and hence, reducing the thermal fatigue, the reliability and lifetime of the PEU is improved. Especially in applications with limited accessibility, such as offshore power generation, this is a major advantage.

According to an aspect of the invention there is provided a method as described above, wherein the discharging is stopped at a larger electric field level value than the minimal electric field level value as obtainable during use.

According to an aspect of the invention there is provided a method as described above, wherein either the discharging is stopped at a larger voltage level value than the minimum voltage level value or the discharging is stopped at a larger charge level value than the minimum charge level value as obtainable during use.

According to an aspect of the invention there is provided a method as described above, wherein the variable capacitor has a net remainder voltage level larger than the minimal voltage level after discharging.

Advantageously, not discharging completely reduces the amount of energy needed for biasing each cycle, which further reduces the current and power levels.

According to an aspect of the invention there is provided a method as described above, wherein the variable capacitor has a net remainder charge level larger than the minimal charge level after discharging.

According to an aspect of the invention there is provided a method as described above, wherein the charging is performed under condition of a constant power supplied to the variable capacitor.

Advantageously, at constant power, the converter is operating for a larger period in a cycle. This makes the operation more continuous and increases the converter utilization. Moreover, the constant power operation of the PEU makes it easier to optimize its efficiency as, for example, in many hard-switched PEUs the switching losses are closely related to the actual output power. A more efficient PEU can significantly increase the EAP conversion efficiency, especially in low deformation applications.

According to an aspect of the invention there is provided a method as described above, wherein the discharging is performed under condition of a constant power delivered by the variable capacitor.

According to an aspect of the invention there is provided a method as described above, wherein the charging is performed using a DC source.

Advantageously, if the EAP based capacitor is connected to a constant voltage source (DC), operating the EAP based capacitor and PEU at constant power also implies a fixed-amplitude current on the DC side. This reduces the stress on the DC bus, simplifying the design and reducing the cost of the system components.

According to an aspect of the invention there is provided a method as described above, wherein the method comprises maintaining the upper electric field level value substantially constant during the relaxation step from maximal stretched size to the minimal relaxed size.

Advantageously, the method allows operation under constant electric field conditions.

According to an aspect of the invention there is provided a method as described above, wherein the method comprises maintaining either a substantially constant charge or a substantially constant voltage during the relaxation step from maximal stretched size to the minimal relaxed size.

Advantageously, the method allows operation under constant charge or constant voltage conditions.

In an embodiment, the present invention provides a method as described above wherein the first predetermined stretch level R3 at the first stretched size L3 before reaching the maximal stretched size L2 equals at least 80% or at least 90% relative stretch with R3=100*(L3−L1)/(L2−L1).

In an embodiment, the present invention provides a method as described above, wherein the second predetermined stretch level R4 at the second stretched size L4 before reaching the minimal stretched size L1 equals at least less than 20% or at least less than 10% relative stretch with R4=100*(L4−L1)/(L2−L1).

Also, the present invention provides a system for harvesting energy using an EAP based deformable body, comprising the EAP based deformable body, a power electronic unit, a monitoring device, an energy storage and supply device and a controller; the EAP based deformable body being a elastically deformable body comprising an arrangement of stretchable synthetic material and electrodes being arranged as a variable capacitor with a capacitance that varies as the deformable body stretches and relaxes; the energy storage and supply device being coupled to the power electronic unit and being arranged for storing and for supplying energy, respectively, from and to the power electronic unit; the power electronic unit being coupled to the variable capacitor of the EAP based deformable body for charging and discharging the capacitor during stretching and relaxation, respectively; the monitoring device being coupled to the EAP based deformable body for monitoring a state of stretching and relaxation of the deformable body and being coupled to the controller for messaging the state of stretching and relaxation to the controller, and the controller being coupled to the power electronic unit, wherein the controller is arranged to control the power electronic unit: to electrically charge the variable capacitor to create an electric field over the capacitor with an upper electric field level value when the deformable body has stretched from a minimal relaxed size to a maximal stretched size; and
to electrically discharge the capacitor to a minimal charge level and a minimal electric field level value when the deformable body has reached the minimal relaxed size during relaxation, wherein based on the monitored state of stretching and relaxation, the controller controls the power electronic unit:
to start the charging during stretching of the deformable body and to initiate the charging at a first stretched size before reaching the maximal stretched size and to continue during relaxation up to a level of a third stretched size, and—to start the discharging during relaxation of the deformable body and to initiate the discharging at a second stretched size before reaching the minimal relaxed size and to continue during stretching up to a level of a fourth stretched size.

BRIEF DESCRIPTION OF DRAWINGS

The invention will be explained in more detail below with reference to drawings in which illustrative embodiments thereof are shown. The drawings are intended exclusively for illustrative purposes and not to restrict the inventive concept, which is defined by the claims.

In the following figures, the same reference numerals refer to similar or identical components in each of the figures.

DETAILED DESCRIPTION OF EMBODIMENTS

The present invention proposes a novel energy harvesting cycle for EAP based actuators and generators such that the energy conversion efficiency is increased while also significantly reducing the cost of such systems.

Although Electro Active Materials are well known for their capability of handling large mechanical deformation (up to 500%), in many practical applications the deformation is limited; not only due to the nature of the application (such as excitation by waves) but also to limit the effect of fatigue. During deformation the EAP material stretches and changes usually both area size and thickness. In such conditions, the amount of energy required to bias the EAP device may be much larger than the energy that is actually available for harvesting.

Where prior art energy harvesting cycles concentrate on the stretching or contracting part of the cycle, the invention focuses on the charging/discharging (biasing) part; where, for small deformation cycles, the majority of the energy is concentrated and most losses arise. While doing so, the conventional cycles remain valid; the invention is an addition to the conventional constant-charge, constant-voltage and constant-field cycles.

Electromechanical energy conversion using Electro Active Polymers (EAP) is based on the mechanical interaction with the electric field established in the EAP material. By applying an electric field and allowing the EAP material to work along with the field, the material is stretched and electrical energy is converted to mechanical energy (actuator mode). By contracting the EAP material and working against the field, mechanical energy is converted to electrical energy (generator mode). Hence, for energy conversion the EAP device needs to be biased by electrical charge to establish the field.

In general, a Power Electronic Unit (PEU) provides the initial bias to the EAP; very similar to conventional capacitor charging/discharging applications. For the actual energy conversion processes, the present invention focuses on the active approach, where the flow of electrical energy is actively controlled during operation of the EAP device; usually by the power electronic unit.

Figure 1:
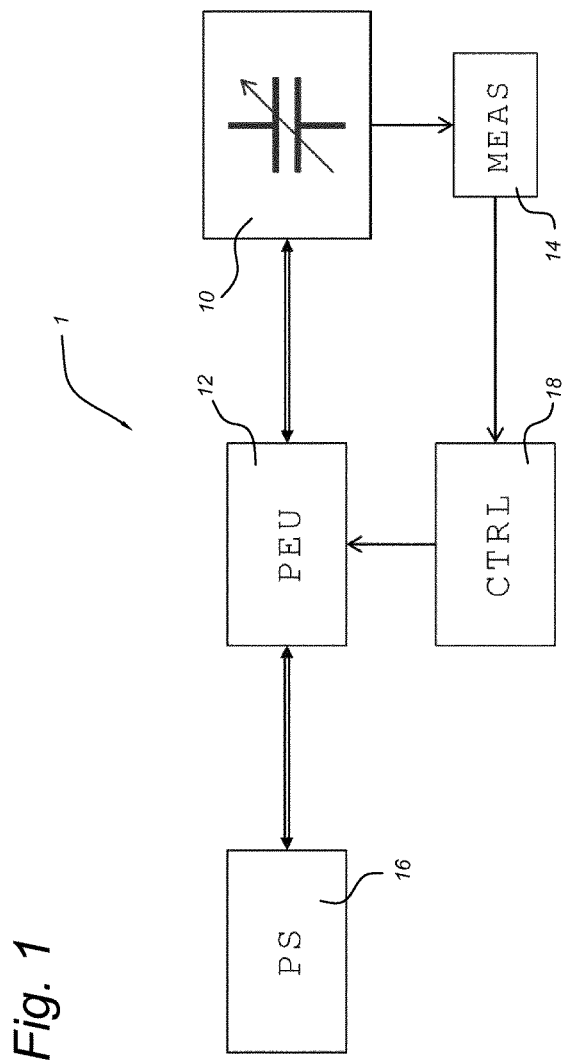
FIG. 1 shows schematically a prior art active EAP energy conversion system.

The PEU actively controls the electrical quantities, such as charge, voltage or electric field, during the harvesting cycle. FIG. 1 shows a typical prior art active energy harvesting system 1.

The energy harvesting system 1 comprises a EAP based deformable body 10, a power electronic unit 12, a monitoring device 14, an energy storage and supply device 16 and a controller 18.

The EAP based deformable body 10 is a elastically deformable body that comprises an arrangement of EAP stretchable synthetic material and electrodes being arranged as a variable capacitor. The capacitance of the capacitor structure varies as the deformable body stretches and relaxes.

The EAP based deformable body or elastically deformable body 10 may be disposed in (a layer of) surface water, for example the sea surface, where waves carrying energy occur. The elastically deformable body is arranged to deform due to exposure to these waves. Such deformation is typically cyclical, comprises both stretching to a stretched state and a relaxation to a substantially undeformed or less deformed state by the interaction with the waves.

In an embodiment, the elastically deformable body may be an elongated tube consisting of a layer of a stretchable synthetic material disposed as a dielectric material between inner electrodes and outer electrodes. The distance between the inner and outer electrodes is determined by the thickness of the layer of the stretchable synthetic material.

Due to the tube shape a water wave may enter the tube and propagate through the tube while at the same time producing a bulge that deforms the tube wall. As a result, the thickness of the layer of a stretchable synthetic material may vary and change the distance between the inner and outer electrodes, allowing the inner and outer electrodes to function as a variable capacitor.

The energy harvesting system 1 allows to harvest energy from the change of capacitance that occurs during the deformation cycle of the elastically deformable body.

The energy storage and supply device 16 is coupled to the power electronic unit 12 and is arranged for storing and for supplying energy, respectively, from and to the power electronic unit.

The power electronic unit 12 is coupled to the inner and outer electrodes of the variable capacitor of the EAP based deformable body 10 for creating an electric field between the inner and outer electrodes by charging and discharging the capacitor during stretching and relaxation, respectively.

The monitoring device 14 is coupled to the EAP based deformable body 10 for monitoring a state of stretching and relaxation of the elastically deformable body. Additionally the monitoring device 14 is coupled to the controller 18 for messaging the state of stretching and relaxation to the controller.

The controller 18 is coupled to the power electronic unit 12 to control that the charging and discharging are synchronized with the deformation cycle of the EAP based deformable body 10.

For a given deformation cycle, the instant at which the electric field is present determines the mode of operation, i.e. actuator or generator mode. The way the electric field is established and controlled during the deformation cycle determines the amount of energy that can be converted. This is described by energy harvesting cycles; at present mainly three distinctive cycles are used in prior art systems that charge and discharge the EAP actively:

1. Constant-Charge (CQ): charging/discharging at the extremes of deformation; no further interaction during the cycle;
2. Constant-Voltage (CV): charging/discharging at the extremes of deformation; maintaining the voltage during contraction or stretching;
3. Constant-Field (CF): charging/discharging at the extremes of deformation; maintaining the electric field constant during contraction or stretching.

Figure 2:
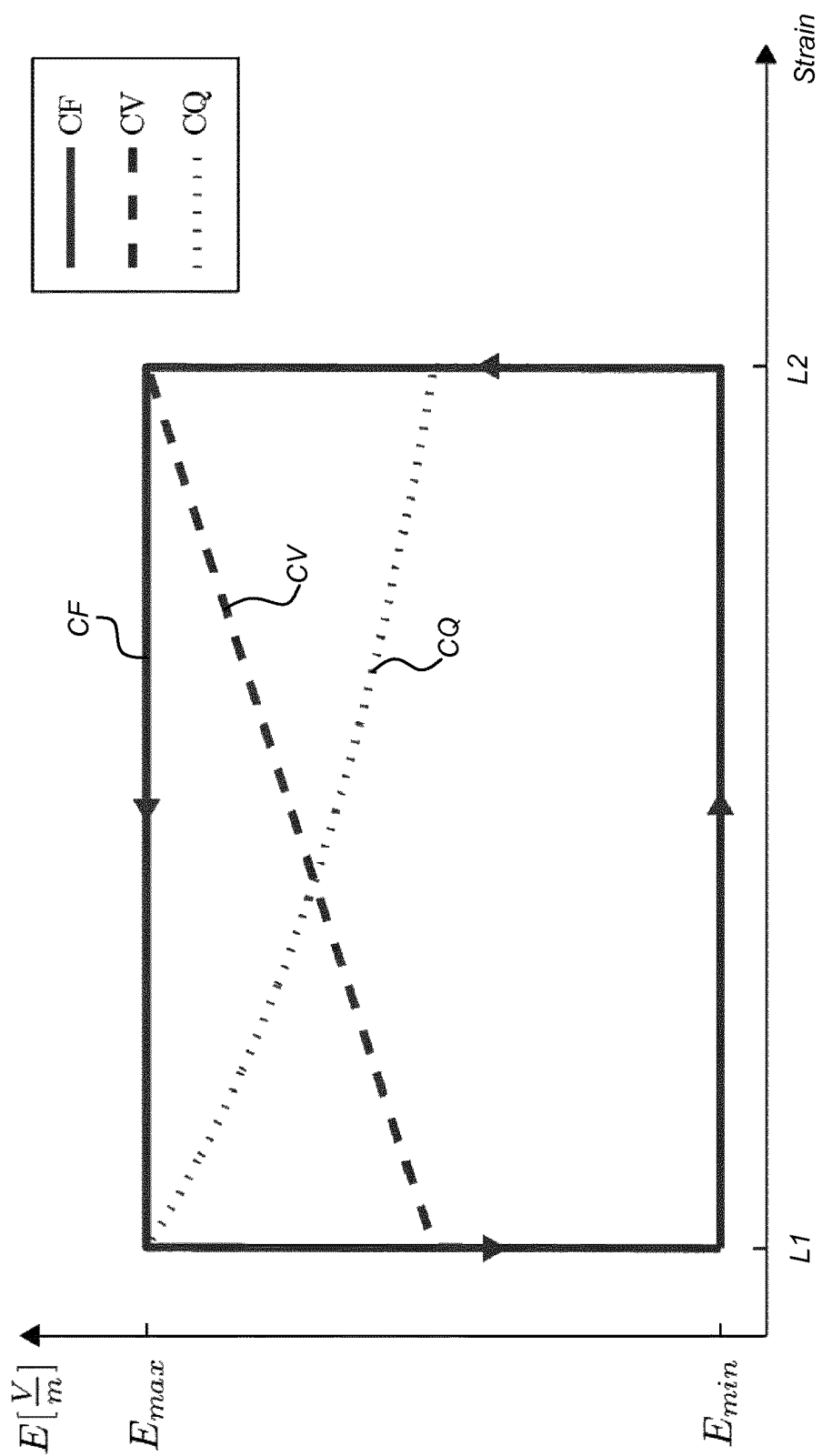
FIG. 2 shows schematically prior art energy harvesting cycles for generator mode, showing the constant-field (CF), constant-voltage (CV) and constant-charge (CQ) cycles.

FIG. 2 provides a graphical overview of the harvesting cycles, where the electric field strength is plotted against strain. Strain is defined here as the difference between the undeformed or less deformed state denoted L1 of the elastically deformed body 10 and the maximal stretched state denoted L2 of the elastically deformable body. Knowing that the amount of energy converted is related squared to the electric field strength; the constant-field (CF) strategy is easily identified as the cycle converting the most energy and hence, the most efficient cycle in terms of energy conversion density.

By maintaining constant electric field during a deformation cycle, the electric field as a function of the strain is represented as a rectangular loop.

In the loop a lower substantially constant electric field value Emin of zero value occurs between an initial undeformed state L1 and the maximal stretched state L2. The rectangular loop can occur by active control of Emin.

From state L1 to state L2, the distance between inner and outer electrodes of the capacitor will decrease. It is noted that also a loop with a constant lower charge level or with a constant minimum voltage level is feasible.

Due to the charging of the capacitor at the maximal stretched state L2, the value of the electric field changes from Emin to Emax. Next, during relaxation from maximal stretched state L2 to minimal stretched state L1, the electric field is kept constant by the PEU. Note that from state L2 to state L1, the distance between inner and outer electrodes of the capacitor will increase.

It is noted that alternatively when using constant charge (CQ) conditions, the electric field will increase during relaxation as indicated by schematic curve CQ.

When using constant voltage (CV) conditions, the electric field will decrease during relaxation as indicated by schematic curve CV.

Finally when arriving at the undeformed or minimal stretched state L1, the PEU is controlled to discharge the capacitor which decreases the electric field value and releases energy from the capacitor accordingly.

As FIG. 2 indicates, the prior art energy harvesting cycles focus on the way the PEU 12 interacts with the EAP device 10 during stretching or contraction. During these periods, the net electromechanical conversion takes place. For biasing (charging) and un-biasing (discharging) the capacitor, the cycle does not describe a specific strategy and charging/discharging is assumed to happen instantly at maximum and minimum stretch, respectively.

However, the amount of energy that is required to bias the EAP device 10 easily exceeds the amount of energy that can actually be harvested from the device. Hence, to allow efficient energy harvesting especially for low-deformation cycles, it is as important to focus on the biasing strategy as on the stretching/contraction period. To illustrate this need, it has been observed that the net energy output as a function of the mechanical deformation is much less than unity. Typically, for a 30% deformation the net energy output equals only 50% of the amount of energy that has been applied during charging and discharging.

The energy harvesting cycle as shown in FIG. 2 prevent an economical and efficient operation of current EAP devices:
1. Fatigue sensitive applications with limited mechanical deformation require large amounts of energy to be processed by the PS 16, the PEU 12 and the EAP device 10, while only a minor part remains as net harvested energy. This tightens the tolerance on losses in the power electronic conversion process, resulting in very high efficiency requirements and corresponding costs for the PEU.
2. Due to short-term, large charging/discharging current pulses, the power rating of the PEU is much larger than the average power output of the EAP device, which makes it economically very difficult to compete with conventional (large scale) electromechanical conversion systems.

Figure 3:
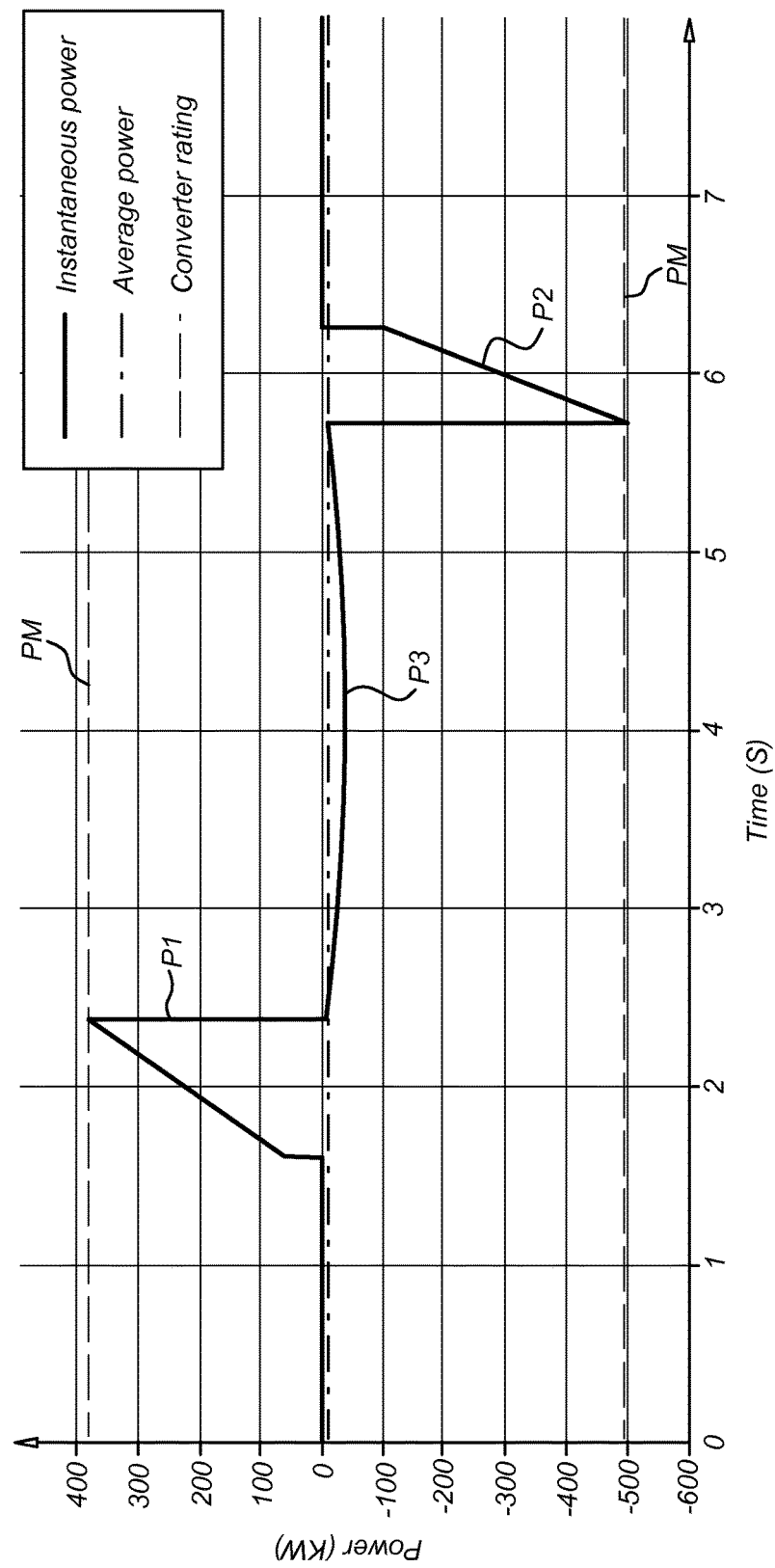
FIG. 3 shows schematically power levels during a constant-field cycle according to the prior art.

FIG. 3 shows a typical example of power levels during a prior art constant-field cycle. The solid line indicates instantaneous power, the dashed line average power and the dotted lines shows required converter ratings.

The illustrated constant field cycle under 40% deformation at ⅛ Hz, shows large (dis)charging peaks P1, P2 and a small power level P3 during the constant-field period. For this particular cycle, the ratio between the maximum power level PM, to which the PEU should be rated, and the net power that is harvested from the EAP device is 43.

Disadvantageously, in such a prior art deformation cycle at constant field (or for constant voltage or constant charge) the pulsed power also cycles the PEU components thermally, which reduces their lifetime. From the theoretical power of 12.2 kW, this particular harvesting cycle with finite current amplitude harvests 11.6 kW (95%), assuming a 100% efficient PEU To improve the conversion efficiency and reduce the power rating and cost of the PEU, the present invention proposes an energy harvesting cycle with an increased charging and discharging time with smaller charging/discharging pulses: advantageously this results in a reduced power rating and relatively less losses in the material due to finite electrode conductivity.

In a further embodiment, the present invention provides a charging/discharging current that is controlled such that the instantaneous power of the PEU is constant during these periods: advantageously this reduces the power rating even further.

In still a further embodiment, the invention provides that a residual charge level or minimum electric field strength is maintained: by not discharging completely reduces the amount of energy needed for biasing each cycle, which advantageously further reduces the current and power levels.

Additionally, the controller may be arranged to emulate virtually any arbitrary or passive harvesting cycle by controlling one or more of the parameters comprising charging time, discharging time, charging/discharging time ratio, current shape and residual charge level.

Figure 4:
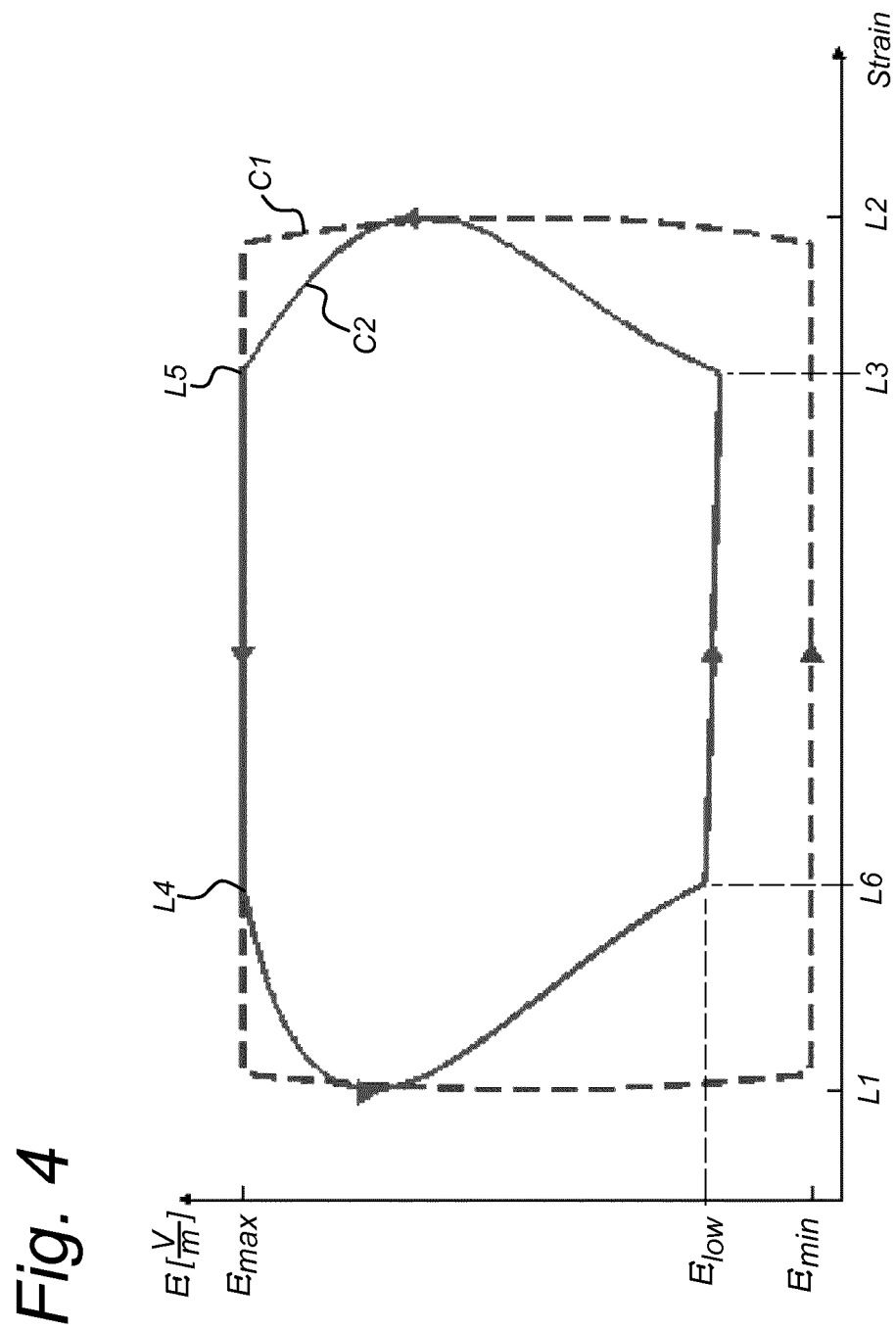
FIG. 4 shows schematically an energy harvesting cycle in accordance with an embodiment of the invention.

An example of a harvesting cycle according to an embodiment of the present invention is shown in FIG. 4.

FIG. 4 provides a graphical overview of the harvesting cycle according to an embodiment of the present invention, where the electric field strength is plotted against strain. In FIG. 4 entities with the same reference number as shown in the preceding figures refer to corresponding entities.

The harvesting cycle according to a method from the prior art is depicted by the dashed-line loop CF. This cycle has been explained with reference to FIG. 2.

The solid-line loop depicts a harvesting cycle in accordance with an embodiment of the present invention.

The elastically deformable body 10 is subjected to a deformation cycle between the minimal stretched state L1 and the maximal stretched state L2. Starting at the minimal stretched or undeformed state L1, the method of the invention provides that although the elastically deformable body is already stretching, the discharging continues during stretching up to substantially a level of a stretched size L6 of a predetermined stretch level R6 above the minimal relaxed size L1.

Next, the charging starts already during stretching of the deformable body and is initiated at a first stretched size L3 of a first predetermined stretch level R3 before reaching the maximal stretched size L2 and continues during relaxation after reaching the maximal stretched level L2 up to a level of the third stretched size L5 of a third predetermined stretch level R5 below the maximal stretched size L2. This third stretched size L5 may be equal or unequal to the first stretched size L3. Charging pulses might be positioned asymmetrically w.r.t. the maximum stretch level. Charging slightly earlier and discharging slightly later may yield higher energy output.

Then during relaxation of the deformable body, before reaching the minimal stretched (or relaxed) size L1, the discharging already starts and is initiated at a second stretched size L4 of second predetermined stretch level R4 and continues during stretching up to substantially a level of the (fourth) stretched size L6 above the minimal stretched state L1.

This fourth stretched size L6 may be equal or unequal to the second stretched size L4. Discharging pulses might be positioned asymmetrically w.r.t. the minimum stretch level. Charging and discharging asymmetrically may yield higher energy output.

In this cycle stretched level L2>first stretched level L3>second stretched level L4>minimal stretched level L1.

The exact values of R3 (and R5) and R4 (and R6) on the conversion loop depend on the material parameters and excitation characteristics. In applications with an excitation with stochastic nature (such as ocean waves), the controller is arranged to adapt R3 and R4 to these conditions.

In an embodiment, first stretched level L3 is about 80% on the scale from L1 to L2, i.e. R3=(L3−L1)/(L2−L1)≈0.8. In an alternative embodiment R3 is about 90%, but other levels are also feasible.

In a further embodiment, second stretched level L4 is about 20% on the scale from L1 to L2, i.e. R4=(L3−L1)/(L2−L1)≈0.2. In an alternative embodiment R4 is about 10% but other levels are also feasible.

Further, in this embodiment, the method provides that discharging is stopped at an electric field level Elow before reaching the minimal electric field value which may correspond to the zero electric field. (Lower than zero field levels would require a net input of energy which adverse affect the energy harvesting principle). In this cycle Emax>Elow>Emin>=zero.

Additionally, in an embodiment, the method provides that during the deformation cycle a constant power is maintained: at constant power, the converter (PEU 12) is operating for a larger period in a cycle. This makes the operation more continuous and increases the converter utilization. Moreover, the constant power operation of the PEU makes it easier to optimize its efficiency as, for example, in many hard-switched PEUs the switching losses are closely related to the actual output power. A more efficient PEU can significantly increase the EAP conversion efficiency, especially in low deformation applications.

Figure 5:
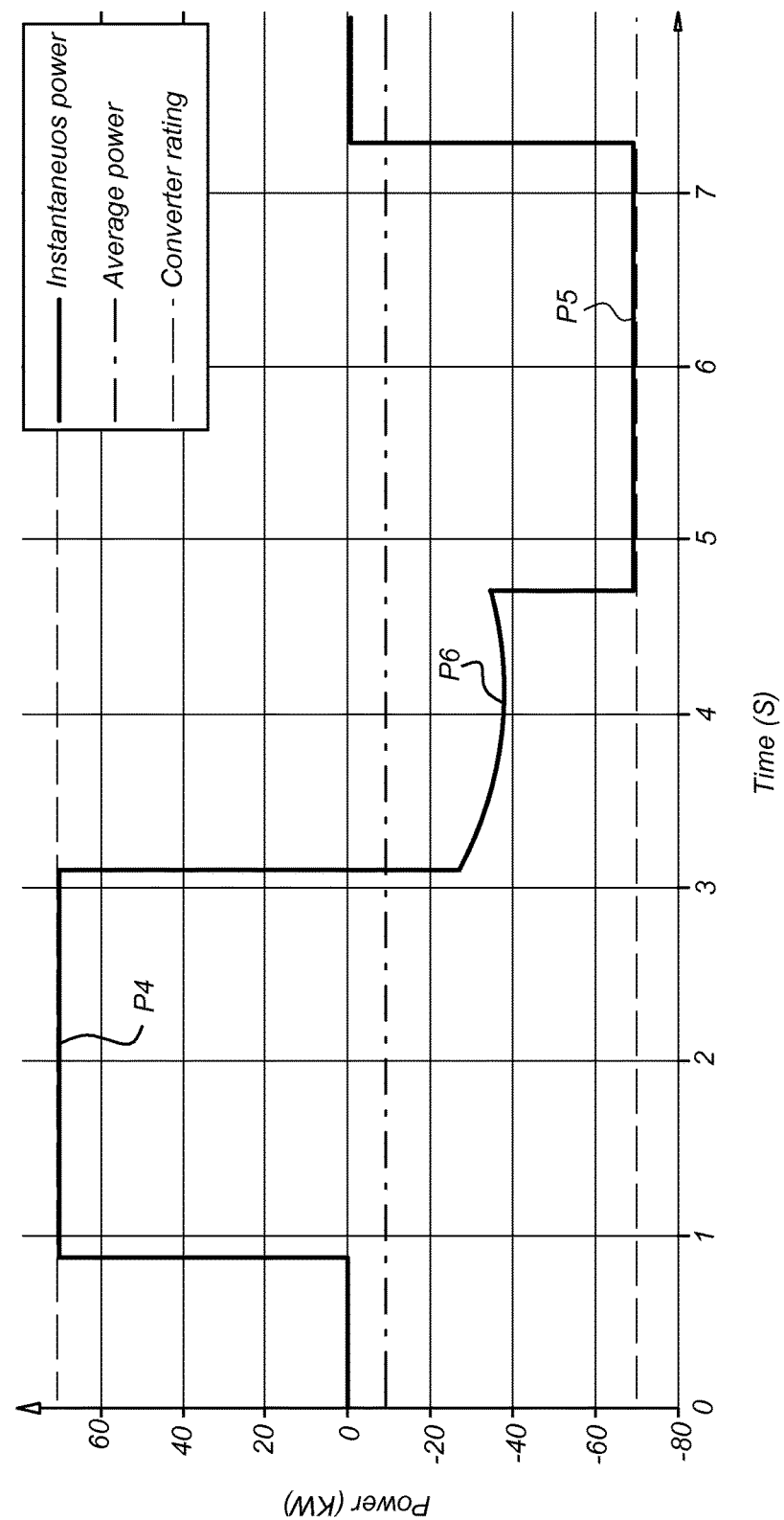
FIG. 5 shows schematically a power waveform of the energy harvesting cycle according to an embodiment of the invention.

FIG. 5 shows schematically a constant power waveform of the energy harvesting cycle.

The solid line indicates instantaneous power, the dashed line average power and the dotted lines shows required converter ratings.

The illustrated constant field cycle under 40% deformation at ⅛ Hz, similar as for the prior art method shown in FIG. 3, shows in comparison with the prior art relatively low (dis)charging peaks P4, P5 that extend for relatively long duration of time. The power level P6 during the constant-field period is relatively larger.

In the energy harvesting cycle shown in FIG. 5, both charging and discharging occurs at constant and relatively low power level. The power related to the constant-field period is more in proportion to the charging/discharging power which relaxes the requirements for the power electronic components and may reduce costs. The ratio between rated and net harvested power is reduced by a factor of 6 compared to the prior art energy harvesting cycle, while the conversion efficiency dropped from 95% to 83%.

Figure 6:
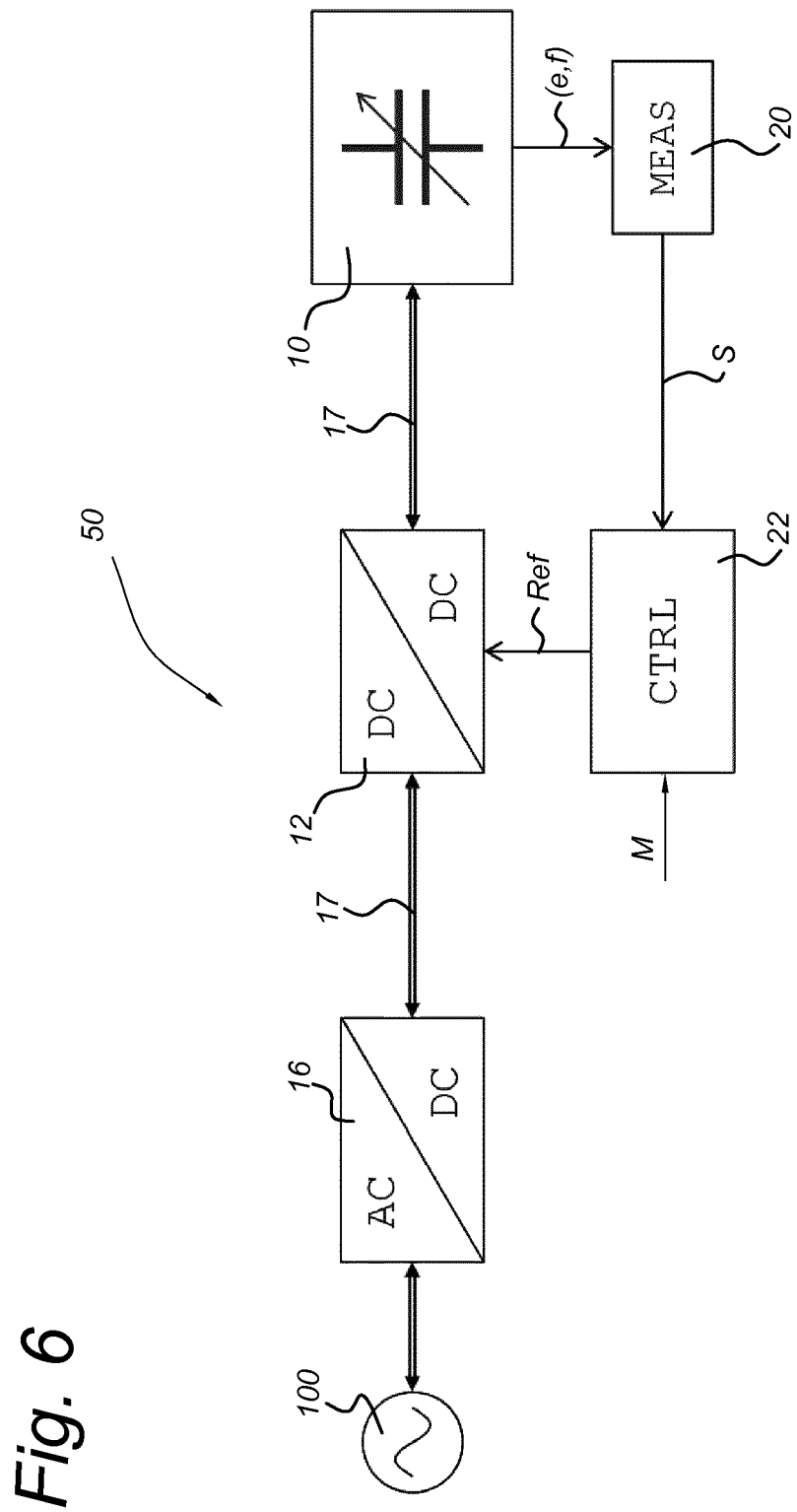
FIG. 6 shows schematically an active EAP energy conversion system according to an embodiment of the invention.

FIG. 6 shows schematically an active EAP energy conversion system 50 according to an embodiment of the invention. In FIG. 6 entities with the same reference number as shown in the preceding figures refer to corresponding entities.

The EAP based actuator/generator system 50 is grid 100 connected by means of a rectifier or inverter 16, creating a DC bus 17 that is used by a buck/boost converter 12 (PEU 12) to interact with the EAP based deformable body 10. A real-time controller 22 controls operation conditions of the EAP based deformable body 10 by generating a reference current REF for the PEU 12. The monitoring device 20 is arranged to determine parameters S associated with the deformation and its frequency. Additionally, the monitoring device is arranged further material parameters associated with Electro Active Material used as stretchable synthetic material and/or the electrodes.

According to the present invention, the controller is arranged to control the power electronic unit using the reference signal REF to electrically charge the variable capacitor to create an electric field over the capacitor with an upper electric field level value when the deformable body has stretched from a minimal relaxed size to a maximal stretched size L2; and
to electrically discharge the capacitor to a minimal charge level and a minimal electric field level value when the deformable body has reached the minimal relaxed size L1 during relaxation. Based on the monitored state S of stretching and relaxation, the controller controls the power electronic unit to start the charging during stretching of the deformable body and to initiate the charging at a first stretched size L3 before reaching the maximal stretched size L2 and to continue during relaxation up to a level of a third stretched size L5, and
to start the discharging during relaxation of the deformable body and to initiate the discharging at a second stretched size L4 before reaching the minimal relaxed size L1 and to continue during stretching up to a level of a fourth stretched size L6.

In an embodiment, the controller 22 is arranged to operate the power electronic unit in a constant power mode in which the variable capacitor is charged/discharged under a condition of constant supplied/delivered power.

Further, the controller is arranged to control the power electronic unit 12 to operate in either constant field (CF), constant charge (CQ) or constant voltage (CV) mode based on an input signal M.

Additionally in an embodiment, the controller is arranged to adapt the timing of the charging and discharging at the respective first, third stretch levels L3, L5 and second, fourth stretch levels L4, L6 respectively in a real-time mode based on sensing of operational parameters comprising the efficiency of the power electronic unit 12, and material parameters of the EAP based deformable body (inter alia series resistance and parallel resistance of the variable capacitor 10).

Also the controller may adapt settings of width of the charging pulse, width of the discharging pulse, current level and residual charge, electric field levels, voltage levels or charge levels based on the sensed operational parameters.

Further the controller may be arranged to determine the adapted settings using an optimization scheme or algorithm.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims.

The invention claimed is:

1. Method for harvesting energy using an EAP based deformable body, the EAP based deformable body being a elastically deformable body comprising an arrangement of stretchable synthetic material and electrodes being arranged as a variable capacitor with a capacitance that varies as the deformable body stretches and relaxes,
the method comprising:
looping through an energy harvesting cycle with
a) stretching the deformable body from a minimal relaxed size L1 to a maximal stretched size L2;
b) at the maximal stretched size electrically charging of the variable capacitor to create an electric field over the capacitor with an upper electric field level value;
and subsequently c) a relaxation step from maximal stretched size to the minimal relaxed size;
d) at the minimal relaxed size of the deformable body, electrically discharging the capacitor to a minimal charge level and a minimal electric field level value,
wherein
the charging starts during stretching of the deformable body and is initiated at a first stretched size L3 before reaching the maximal stretched size L2 and continues after reaching the maximum during relaxation up to a level of a third stretched size L5, and
the discharging starts during relaxation of the deformable body and is initiated at a second stretched size L4 before reaching the minimal relaxed size L1, and continues after reaching the minimum during stretching up to a level of a fourth stretched size L6.

2. Method according to claim 1, wherein the discharging is stopped at a larger electric field level value than the zero electric field level value.

3. Method according to claim 1, wherein the variable capacitor has a net remainder charge level larger than the minimal charge level after discharging.

4. Method according to claim 1, wherein either the discharging is stopped at a larger voltage level value than the minimum voltage level value or the discharging is stopped at a larger charge level value than the minimum charge level value.

5. Method according to claim 1, wherein the variable capacitor has a net remainder voltage level larger than the minimal voltage level after discharging.

6. Method according to claim 1, wherein the charging is performed under condition of a constant power supplied to the variable capacitor.

7. Method according to claim 1, wherein the discharging is performed under condition of a constant power delivered by the variable capacitor.

8. Method according to claim 1, wherein the charging is performed using a DC source.

9. Method according to claim 1, wherein the method comprises maintaining the upper electric field level value substantially constant during the relaxation step from maximal stretched size to the minimal relaxed size.

10. Method according to claim 1, wherein the method comprises maintaining either a substantially constant charge or a substantially constant voltage during the relaxation step from maximal stretched size to the minimal relaxed size.

11. Method according to claim 1, wherein the first predetermined stretch level R3 at the first stretched size L3 before reaching the maximal stretched size L2 equals at least 80% or at least 90% relative stretch with $R3=100*(L3-L1)/(L2-L1)$.

12. Method according to claim 1, wherein the second predetermined stretch level R4 at the second stretched size L4 before reaching the minimal stretched size L1 equals at least less than 20% or at least less than 10% relative stretch with $R4=100*(L4-L1)/(L2-L1)$.

13. System for harvesting energy using an EAP based deformable body, comprising the EAP based deformable body, a power electronic unit, a monitoring device, an energy storage and supply device and a controller;
the EAP based deformable body being a elastically deformable body comprising an arrangement of stretchable synthetic material and electrodes being arranged as a variable capacitor with a capacitance that varies as the deformable body stretches and relaxes; the energy storage and supply device being coupled to the power electronic unit and being arranged for storing and for supplying energy, respectively, from and to the power electronic unit; the power electronic unit being coupled to the variable capacitor of the EAP based deformable body for charging and discharging the capacitor during stretching and relaxation, respectively; the monitoring device being coupled to the EAP based deformable body for monitoring a state of stretching and relaxation of the deformable body and being coupled to the controller for messaging the state of stretching and relaxation to the controller, and the controller being coupled to the power electronic unit, wherein the controller is arranged to control the power electronic unit:
to electrically charge the variable capacitor to create an electric field over the capacitor with an upper electric field level value when the deformable body has stretched from a minimal relaxed size to a maximal stretched size L2; and
to electrically discharge the capacitor to a minimal charge level and a minimal electric field level value when the deformable body has reached the minimal relaxed size L1 during relaxation, wherein
based on the monitored state of stretching and relaxation, the controller controls the power electronic unit:
to start the charging during stretching of the deformable body and to initiate the charging at a first stretched size L3 before reaching the maximal stretched size L2 and to continue after reaching the maximum during relaxation upto a level of a third stretched size L5, and
to start the discharging during relaxation of the deformable body and to initiate the discharging at a second stretched size L4 before reaching the minimal relaxed size L1 and to continue during stretching up to a level of a fourth stretched size L6.

14. System according to claim 13, wherein based on the monitored state of stretching and relaxation, the controller controls the power electronic unit to stop the discharging at a larger electric field level value than the minimal electric field level value.

15. System according to claim 13, wherein based on the monitored state of stretching and relaxation, the controller controls the power electronic unit to stop discharging at a larger voltage level value than the minimum voltage level value or \ at a larger charge level value than the minimum charge level value.

16. System according to claim 13, wherein the variable capacitor has a net remainder charge level larger than the minimal charge level after discharging.

17. System according to claim 13, wherein the variable capacitor has a net remainder voltage level larger than the minimal voltage level after discharging.

18. System according to claim 13, wherein the controller controls the power electronic unit to perform the charging under condition of a constant power supplied to the variable capacitor.

19. System according to claim 13, wherein the controller controls the power electronic unit to perform the discharging under condition of a constant power delivered by the variable capacitor.

20. System according to claim 13, wherein the energy storage and supply device is a DC source.

21. System according to claim 13, wherein the controller controls the power electronic unit to maintain the upper electric field level value substantially constant during the relaxation step from maximal stretched size to the minimal relaxed size.

22. System according to claim 13, wherein the controller controls the power electronic unit to maintain either a substantially constant charge or a substantially constant voltage during the relaxation step from maximal stretched size to the minimal relaxed size.

23. System according to claim 13, wherein the monitoring device is arranged to monitor when either one of the first and second predetermined stretched levels is reached.

* * * * *